United States Patent
Otsuka et al.

(10) Patent No.: US 11,736,019 B2
(45) Date of Patent: Aug. 22, 2023

(54) SWITCHING POWER SUPPLY CIRCUIT

(71) Applicant: DENSO CORPORATION, Kariya (JP)

(72) Inventors: Shigeki Otsuka, Kariya (JP); Naoto Kikuchi, Nagakute (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 17/472,913

(22) Filed: Sep. 13, 2021

(65) Prior Publication Data

US 2022/0085719 A1  Mar. 17, 2022

(30) Foreign Application Priority Data

Sep. 15, 2020 (JP) ................................ 2020-154613

(51) Int. Cl.
    *H02M 3/158* (2006.01)
    *H02M 3/157* (2006.01)
    *H02M 1/38* (2007.01)
    *H02M 1/00* (2006.01)

(52) U.S. Cl.
    CPC ....... *H02M 3/1588* (2013.01); *H02M 1/0025* (2021.05); *H02M 1/38* (2013.01); *H02M 3/157* (2013.01)

(58) Field of Classification Search
    CPC .......................... H02M 3/1588; H02M 1/0025
    See application file for complete search history.

(56) References Cited

U.S. PATENT DOCUMENTS

| | | | | |
|---|---|---|---|---|
| 7,928,715 B2 * | 4/2011 | Shibata | .................. | H02M 1/32 323/284 |
| 10,218,274 B1 * | 2/2019 | Chan | ....................... | H02M 1/14 |
| 2003/0222629 A1 * | 12/2003 | Inoue | .................. | H02M 3/1588 323/224 |
| 2004/0008528 A1 * | 1/2004 | Umemoto | ........... | H02M 3/1588 363/49 |
| 2004/0169498 A1 * | 9/2004 | Goder | ..................... | H02M 1/36 323/222 |
| 2004/0207375 A1 * | 10/2004 | Umemoto | ............. | H02M 3/156 323/282 |
| 2006/0103332 A1 * | 5/2006 | Motomori | ........... | H02M 3/1588 315/308 |
| 2009/0039851 A1 * | 2/2009 | Fukushi | ............... | H02M 3/1588 323/283 |
| 2010/0289471 A1 * | 11/2010 | Kasai | .................. | H02M 3/1588 323/282 |
| 2012/0043949 A1 * | 2/2012 | Nakamura | ........... | H02M 3/1588 323/271 |

(Continued)

*Primary Examiner* — Kyle J Moody
(74) *Attorney, Agent, or Firm* — Posz Law Group, PLC

(57) ABSTRACT

A signal generation circuit includes: a capacitor charged and discharged by a current proportional to an input voltage; a switch controlling charging and discharging of the capacitor based on an output signal of a comparator that compares a feedback voltage according to an output voltage and a predetermined first reference voltage; a reference voltage generation unit generating a second reference voltage that is generated by adding an offset voltage proportional to the input voltage to an output proportional voltage proportional to the output voltage; and a comparator comparing a terminal voltage of the capacitor and the second reference voltage, and generates an ON-time signal based on an output signal of the comparator.

7 Claims, 12 Drawing Sheets

(56) References Cited

U.S. PATENT DOCUMENTS

| | | | | |
|---|---|---|---|---|
| 2013/0335045 A1* | 12/2013 | Zhang | .................... | H02M 3/158 |
| | | | | 323/271 |
| 2015/0280567 A1* | 10/2015 | Fukumoto | ............. | H02M 3/156 |
| | | | | 323/271 |
| 2018/0262113 A1* | 9/2018 | Asahi | .................... | H02M 3/156 |
| 2019/0028030 A1 | 1/2019 | Aoki | | |

* cited by examiner

SWITCHING POWER SUPPLY CIRCUIT

CROSS REFERENCE TO RELATED APPLICATION

The present application is based on and claims the benefit of priority of Japanese Patent Application No. 2020-154613, filed on Sep. 15, 2020, the disclosure of which is incorporated herein by reference.

TECHNICAL FIELD

The present disclosure generally relates to a synchronous rectification type switching power supply circuit that converts an input voltage into a desired output voltage by turning two switching elements ON and OFF in a complementary/alternating manner.

BACKGROUND INFORMATION

Conventionally, as a synchronous rectification type switching power supply circuit, there is a hysteresis control type that detects output ripple by a comparator and controls ON/OFF of a switching element. This conventional power supply circuit uses a COT control method, which is a kind of hysteresis control method. COT is an abbreviation for Constant On Time. Although the hysteresis control method can handle a high-speed load response, it has a drawback that the switching frequency fluctuates.

Therefore, in order to suppress such fluctuations in the switching frequency, an adaptive COT control type switching power supply circuit that controls a fixed ON-time according to an input voltage and an output voltage has been proposed. As a configuration of such a switching power supply circuit, for example, a configuration example as shown in FIG. 9 can be mentioned. As shown in FIG. 9, a switching power supply circuit 101 includes two switching elements 2 and 3. The switching power supply circuit 101 is a synchronous step-down switching power supply circuit that converts an input voltage VIN supplied from a DC power supply 4 into a desired output voltage VOUT by turning ON and OFF the two switching elements 2 and 3 in a complementary manner.

The switching elements 2 and 3 are, for example, MOS transistors. One of main terminals of the switching element 2 is connected to an input power supply line 5 to which the input voltage VIN is applied, and the other main terminal is connected to a node N1. One of main terminals of the switching element 3 is connected to the node N1, and the other main terminal is connected to the ground to which a reference potential of the circuit is given. An inductor 7 is connected between the node N1 and an output power supply line 6 for outputting the output voltage VOUT. A capacitor 8 is connected between the output power supply line 6 and the ground.

A resistor 9 and a resistor 10 are connected in series between the output power supply line 6 and the ground. The resistor 9 and the resistor 10 form a voltage dividing circuit that divides the output voltage VOUT. The voltage of a node N2, which is an interconnect node of the resistor 9 and the resistor 10, is a feedback voltage VFB obtained by dividing the output voltage VOUT, and is given to an inverting input terminal of the comparator 11. A reference voltage VREF generated by a voltage source 12 is given to a non-inverting input terminal of the comparator 11. The reference voltage VREF is a voltage corresponding to a target value of the output voltage VOUT.

The output signal of the comparator 11 is a trigger signal Sa, and the trigger signal Sa is given to a signal generation circuit 13. The signal generation circuit 13 generates an ON-time signal Sb corresponding to an ON-time for turning ON of the switching elements 2 and 3 based on the trigger signal Sa, the input voltage VIN, and the output voltage VOUT. The ON-time signal Sb generated by the signal generation circuit 13 is given to a drive circuit 14. The drive circuit 14 generates drive signals Sc and Sd based on the ON-time signal Sb, and outputs the drive signals Sc and Sd to gates of the switching elements 2 and 3. The switching elements 2 and 3 are driven based on the drive signals Sc and Sd, respectively. In such manner, the drive circuit 14 drives the switching elements 2 and 3 based on the ON-time signal Sb.

Specific examples of the signal generation circuit 13 include a first configuration example as shown in FIG. 10 and a second configuration example as shown in FIG. 11. In the first configuration example shown in FIG. 10, the signal generation circuit 13 includes a resistor 21, a current mirror circuit 22, a transistor 23, a capacitor 24, and a comparator 25. One terminal of the resistor 21 is connected to the input power supply line 5 to which the input voltage VIN is applied, and the other terminal of the resistor 21 is connected to the ground via a transistor 27 on the input side of the current mirror circuit 22. Since the transistor 27 is connected (i.e., used) as a so-called diode, it is represented by a diode symbol in FIG. 10 and the like.

One of main terminals of a transistor 28 on the output side of the current mirror circuit 22 is connected to a power supply line 29 to which a power supply voltage VDD is applied. The power supply voltage VDD is a predetermined voltage lower than the input voltage VIN of 5V, for example. Since the transistor 28 is a transistor for current output, it is represented by a symbol of a current source in FIG. 10 and the like. The other main terminal of the transistor 28 is connected to a node N21. According to such a configuration, the output current of the current mirror circuit 22 becomes a current proportional to the input voltage VIN, and is output toward the node N21.

The transistor 23 is an N-channel type MOS transistor. The drain of the transistor 23 is connected to the node N21 and its source is connected to the ground. A capacitor 24 is connected between the drain and source of the transistor 23, that is, between the node N21 and the ground. The trigger signal Sa is given to the gate of the transistor 23. Therefore, the transistor 23 is turned ON and OFF by the trigger signal Sa. According to such a configuration, the capacitor 24 is charged and discharged by a current proportional to the input voltage VIN output from the current mirror circuit 22 according to the ON/OFF of the transistor 23.

In such case, the transistor 23 functions as a switch that controls charging/discharging of the capacitor 24 based on the trigger signal Sa output from the comparator 11. A terminal voltage Vc of the capacitor 24 is given to the inverting input terminal of the comparator 25. An output proportional voltage Vo proportional to the output voltage VOUT is given to the non-inverting input terminal of the comparator 25. In such case, the output signal of the comparator 25 becomes the ON-time signal Sb.

On the other hand, the second configuration example shown in FIG. 11 is different from the first configuration example in that an SR latch circuit 26 is added. In such case, the output proportional voltage Vo is given to the inverting input terminal of the comparator 25, and the terminal voltage Vc thereof is given to the non-inverting input terminal. Further, in such case, the output signal of the comparator 25 is given to a reset terminal R of the SR latch circuit 26. The trigger signal Sa is given to a set terminal S of the SR latch circuit 26. The inverting output signal output from an inverting output terminal Q bar of the SR latch circuit 26 is given to the gate of the transistor 23. Note that, in FIG. 11 and in other FIGS., the inverting output terminal of the SR latch circuit 26 is indicated by adding "-" above the reference numeral Q.

As described above, in the second configuration example, the ON/OFF of the transistor 23 is controlled by the inverting output signal of the SR latch circuit 26. In such case, the non-inverting output signal output from the non-inverting output terminal Q of the SR latch circuit 26 becomes the ON-time signal Sb. According to the above configuration, even when noise is superimposed on the trigger signal Sa, the influence of the noise does not appear on any of the output signals of the SR latch circuit 26. Therefore, according to the second configuration example, even when noise is superimposed on the trigger signal Sa, the ON-time signal Sb can be accurately generated without being affected by the noise. Note that, in the following description, the switching power supply circuit 101 having the above configuration will be referred to as a conventional configuration.

In the conventional configuration, the output ripple in the feedback voltage VFB is detected by the comparator 11, and the trigger signal Sa output from the comparator 11 is input to the signal generation circuit 13. In the signal generation circuit 13, the ON/OFF of the transistor 23 is controlled based on the trigger signal Sa, and as a result, the capacitor 24 is charged and discharged by an electric current I proportional to the input voltage VIN. The current I is represented by the following equation (1). Note that, R is the resistance value of the resistor 21, and G is the current amplification factor of the current mirror circuit 22. In each of the mathematical equations including the following equation (1), indexes are represented by subscripts.

Equation (1)

$$I = \frac{V_{IN}}{R} \cdot G \qquad (1)$$

In the signal generation circuit 13, the terminal voltage Vc of the capacitor 24 and the output proportional voltage Vo proportional to the output voltage VOUT are compared by the comparator 25, and a pulsed ON-time signal Sb is generated based on the output signal corresponding to the comparison result. The terminal voltage Vc and the output proportional voltage Vo have waveforms as shown in FIG. 12. A pulse width Ton of the ON-time signal Sb is represented by the following equation (2). Note that C is the capacitance value of the capacitor 24.

Equation (2)

$$T_{on} = \frac{C}{I} \cdot V_o \qquad (2)$$

By substituting the equation (1) for the equation (2), the following equation (3) can be obtained. Further, the definition of the ON-time Ton in the switching power supply circuit 101 is represented by the following equation (4). Note that fsw is a switching frequency of the switching elements 2 and 3.

Equation (3) & (4)

$$T_{on} = \frac{V_o}{V_{IN}} \cdot \frac{RC}{G} \qquad (3)$$

$$T_{on} = \frac{V_o}{V_{IN}} \cdot \frac{1}{f_{SW}} \qquad (4)$$

The following equation (5) can be obtained from the equations (3) and (4).

Equation (5)

$$f_{SW} = \frac{G}{RC} \qquad (5)$$

By setting the resistance value R, the capacitance value C, and the current amplification factor G to satisfy the above equation (5), the ON-time signal Sb having the pulse width Ton of a fixed ON-time proportional to the ratio of the input voltage VIN and the output voltage VOUT is generated. The drive circuit 14 controls the ON/OFF of the switching elements 2 and 3 based on such an ON-time signal Sb. As a result, in the conventional configuration, the duty of the drive signals Sc and Sd changes with respect to the fluctuation of the input voltage VIN, thereby suppressing the fluctuation of the switching frequency fsw.

However, in the conventional configuration, in order to avoid the two switching elements 2 and 3 from being turned ON at the same time, a dead time τd as shown in FIG. 13 is set in the drive circuit 14. As shown in FIG. 13 and the following equation (6), the actual ON-time Ton_d, which is the pulse width of the drive signal Sc or Sd, is shorter than the ON-time Ton, which is the pulse width of the ON-time signal Sb, by the amount of the dead time τd. That is, in such case, the actual pulse width Ton_d of the drive signal Sc or Sd is narrower by the dead time τd with respect to the pulse width of the ON drive signal Sd.

[Equation (6)]

$$T_{on\_d} = \frac{V_o}{V_{IN}} \cdot \frac{1}{f_{SW}} - \tau_d \qquad (6)$$

For such a reason, in the conventional configuration, the electric charge injected into an LC tank composed of the inductor 7 and the capacitor 8 is reduced, and as a result, the actual switching frequency is increased. Further, the signal generation circuit 13 generates an ON-time signal Sb having a pulse width Ton inversely proportional to the input voltage VIN. Therefore, when the input voltage VIN is relatively high, the pulse width Ton becomes narrow and the ratio of the dead time τd increases. As a result, the actual pulse width Ton_d of the drive signal Sc or Sd becomes narrower, thereby the switching frequency becomes higher.

SUMMARY

It is an object of the present disclosure to provide a switching power supply circuit capable of suppressing fluctuations in a switching frequency due to an influence of dead time.

A switching power supply circuit according to one aspect, including two switching elements, is a synchronous rectification type switching power supply circuit, that converts an input voltage into a desired output voltage by turning these two switching elements ON and OFF in a complementary manner, and comprises: a first comparator, a signal generation circuit, and a drive circuit.

The first comparator compares a feedback voltage corresponding to the output voltage with a predetermined first reference voltage.

The signal generation circuit generates an ON-time signal corresponding to an ON-time for turning ON the switching element based on an output signal of the first comparator, the input voltage, and the output voltage.

The drive circuit drives the switching element based on the ON-time signal.

In such case, the signal generation circuit includes: a capacitor that is charged and discharged by an electric current proportional to the input voltage; a switch that controls charging and discharging of the capacitor based on the output signal of the first comparator; a reference voltage generator that generates a second reference voltage, which is a voltage obtained by adding an offset voltage proportional to the input voltage to an output proportional voltage proportional to the output voltage; and a second comparator that compares a terminal voltage of the capacitor and the second reference voltage.

Further, the signal generation circuit generates the ON-time signal based on the output signal of the second comparator.

According to the above configuration, in the second comparator for generating the ON-time signal, the second reference voltage to be compared with the terminal voltage of the capacitor is a voltage obtained by adding an offset voltage proportional to the input voltage to the output proportional voltage.

Therefore, the pulse width of the ON-time signal generated by the signal generation circuit changes according to the input voltage so that the pulse width becomes wider as the input voltage becomes higher and becomes narrower as the input voltage becomes lower.

As a result, in the above configuration, the decrease in the pulse width due to the influence of the dead time is corrected, and as a result, the fluctuation of the switching frequency is suppressed.

Therefore, according to the above configuration, it is possible to prevent the switching frequency from further increasing even when the input voltage becomes relatively high due to the influence of the dead time.

By suppressing fluctuations in the switching frequency in the above-described manner, in the switching power supply circuit having the above configuration, it is possible to achieve the following effects, i.e., to optimize the constants of the noise filter inserted on the substrate for suppressing radiation noise thereby reducing the component cost.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, embodiments of the present disclosure are described with reference to the drawings. In the following embodiments, substantially identical elements have the same numerals, and description of the identical elements will not be repeated.

First Embodiment

Hereinafter, the first embodiment will be described with reference to FIG. 1 to FIG. 3

Figure 1:
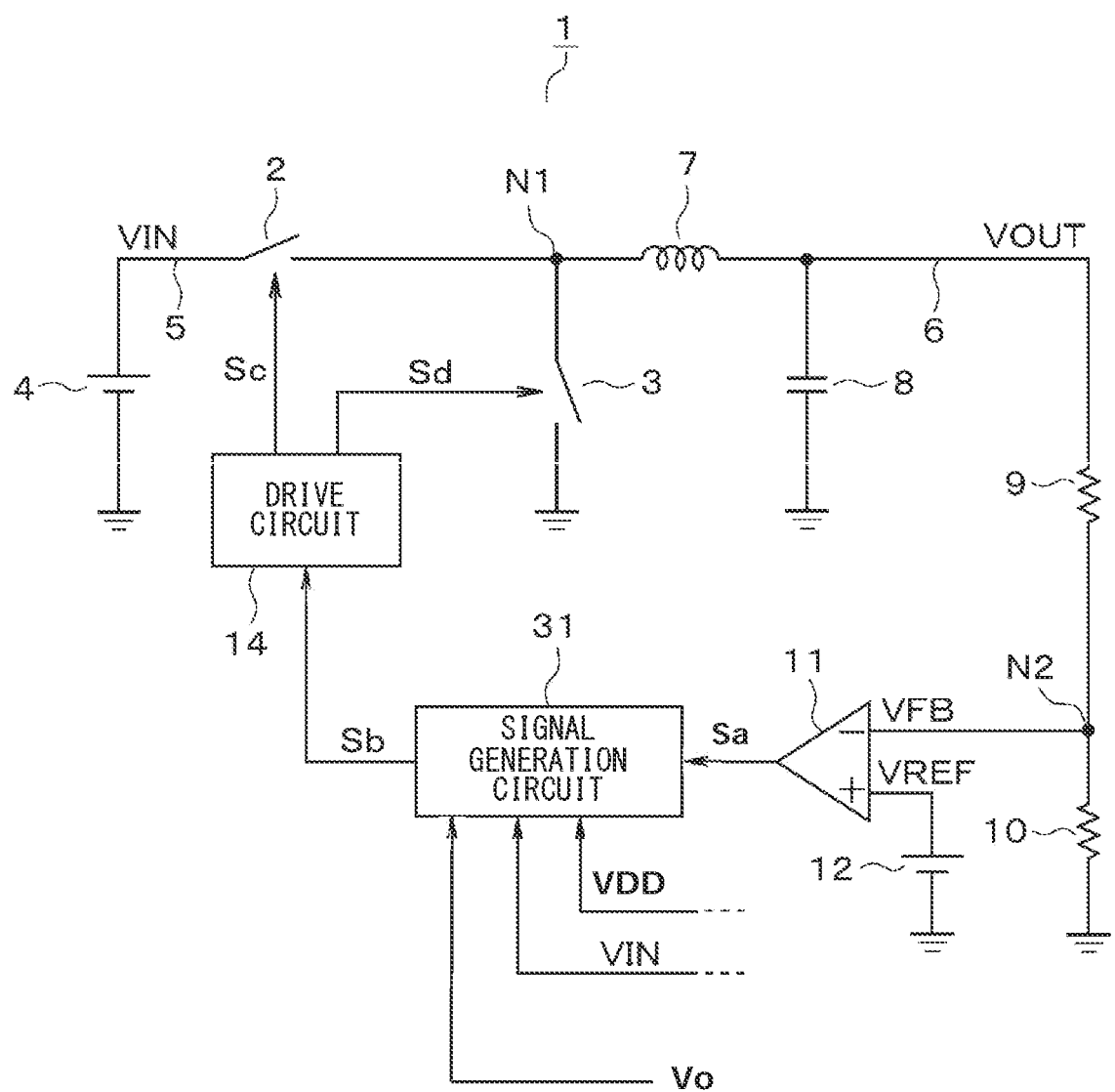
FIG. 1 is a diagram schematically showing a configuration of a switching power supply circuit according to a first embodiment.
Figure 9:
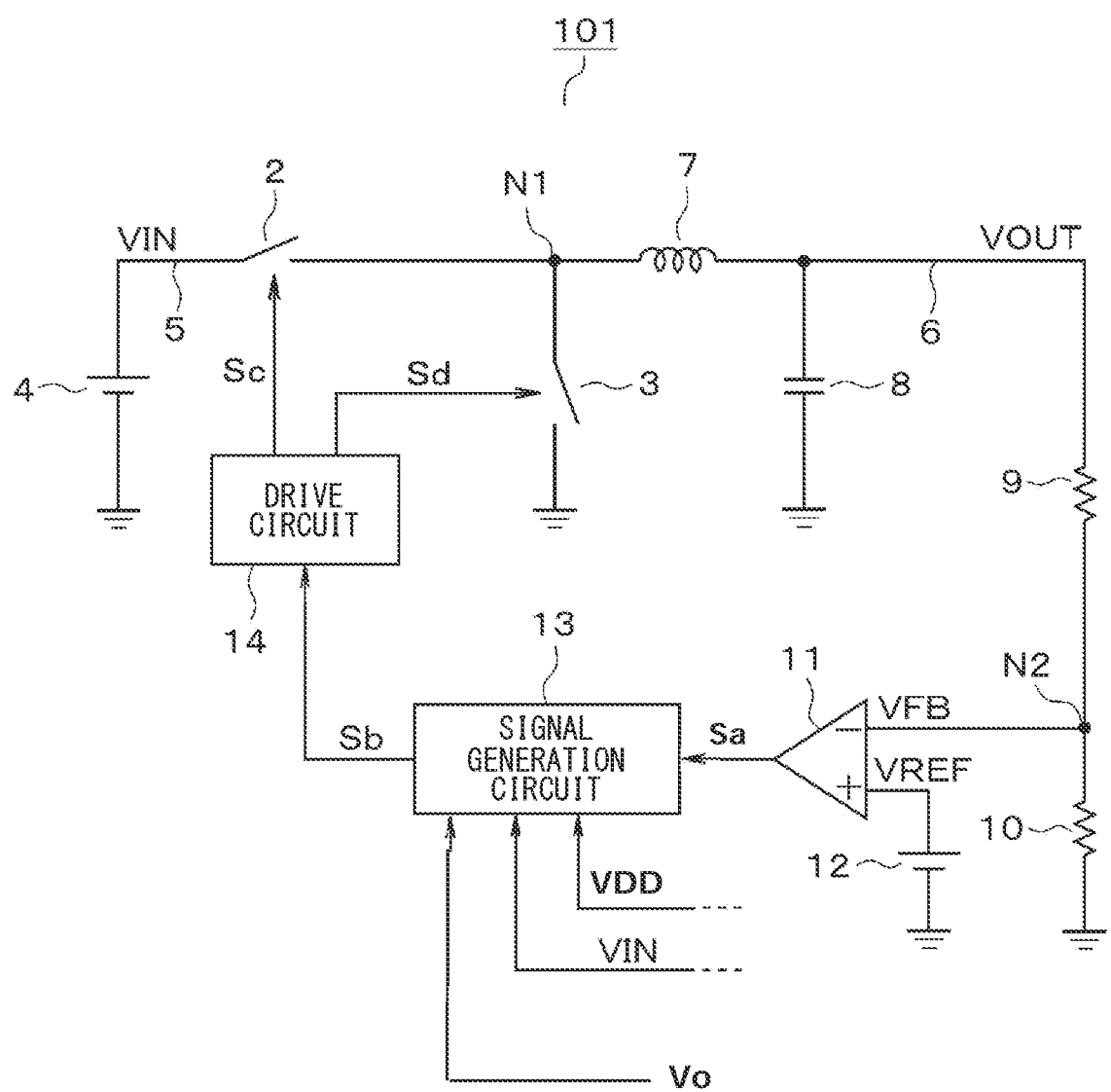
FIG. 9 is a diagram schematically showing a configuration of a switching power supply circuit according to a conventional configuration.
Figure 10:
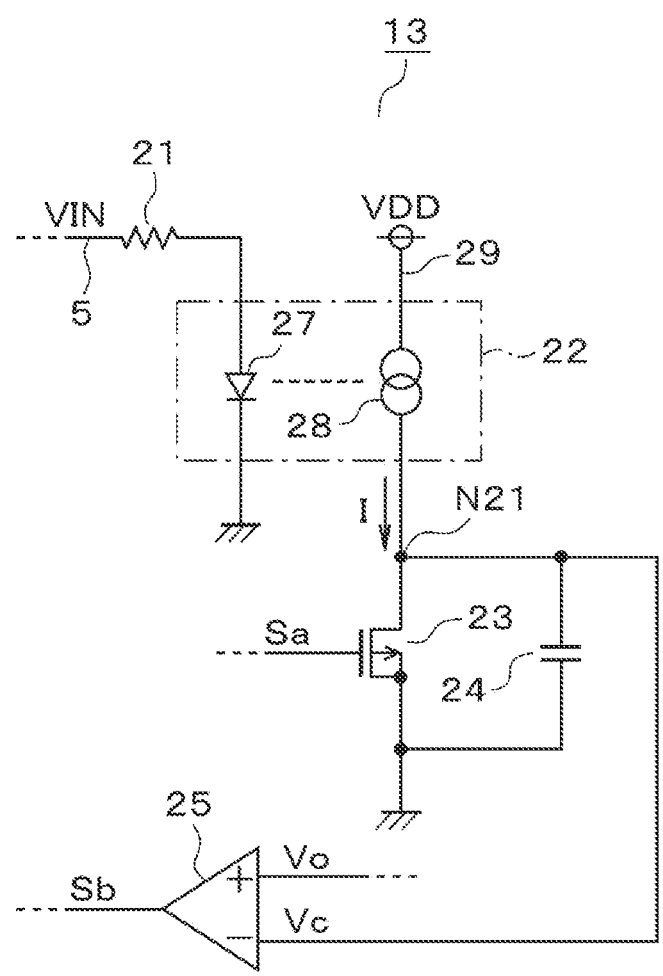
FIG. 10 is a diagram showing a first configuration example of a signal generation circuit according to the conventional configuration.

A switching power supply circuit 1 of the present embodiment shown in FIG. 1 is different from a switching power supply circuit 101 of the conventional configuration shown in FIG. 9 in that a signal generation circuit 31 is provided instead of a signal generation circuit 13. In the present embodiment, the same reference numerals are given to substantially the same configurations as the conventional configurations, and the description thereof will be omitted. In the present embodiment, a reference voltage VREF corresponds to a first reference voltage, and a comparator 11 functions as a first comparator for comparing a feedback voltage VFB and the reference voltage VREF.

Figure 2:
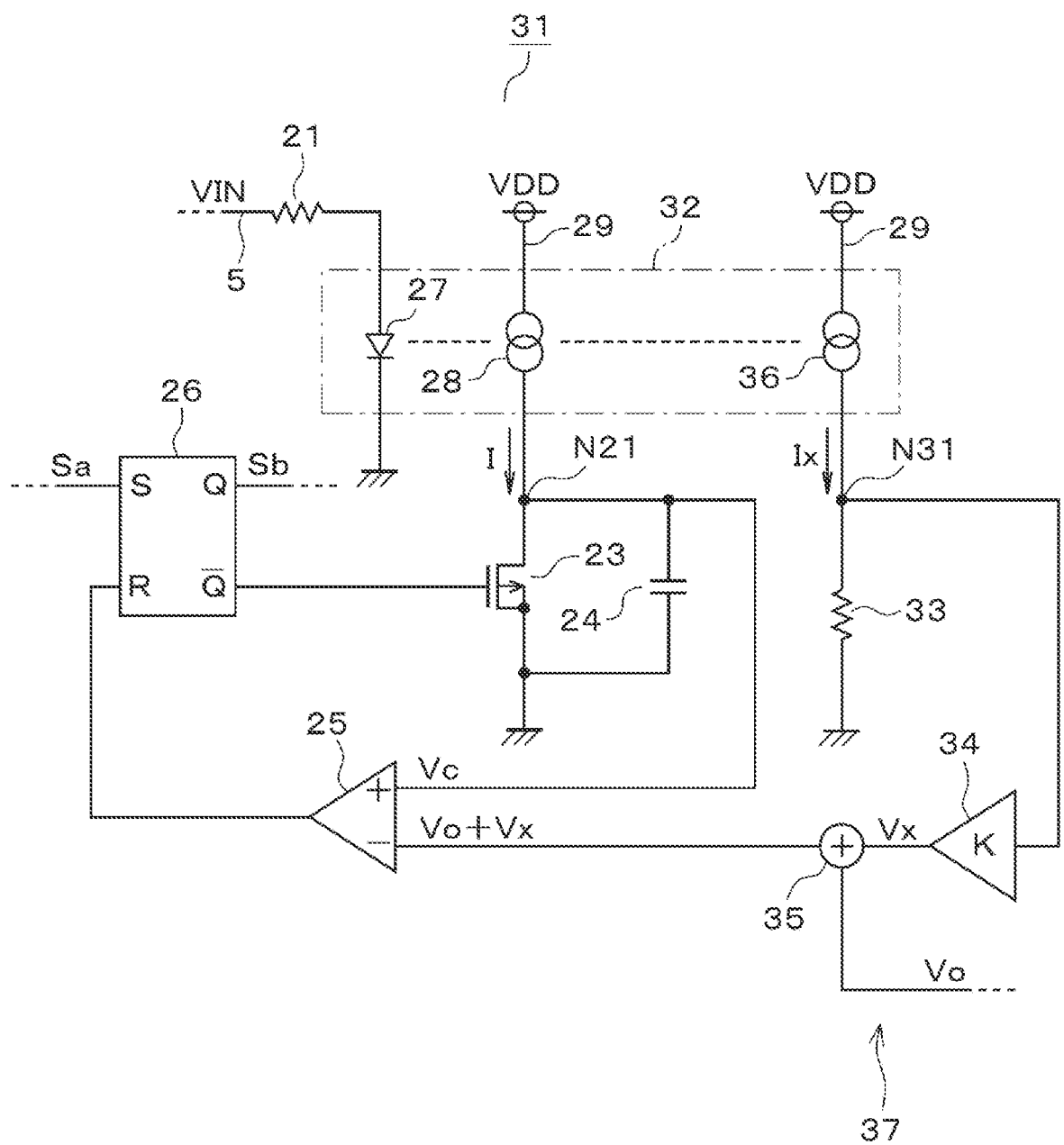
FIG. 2 is a diagram showing a specific configuration example of a signal generation circuit according to the first embodiment.
Figure 11:
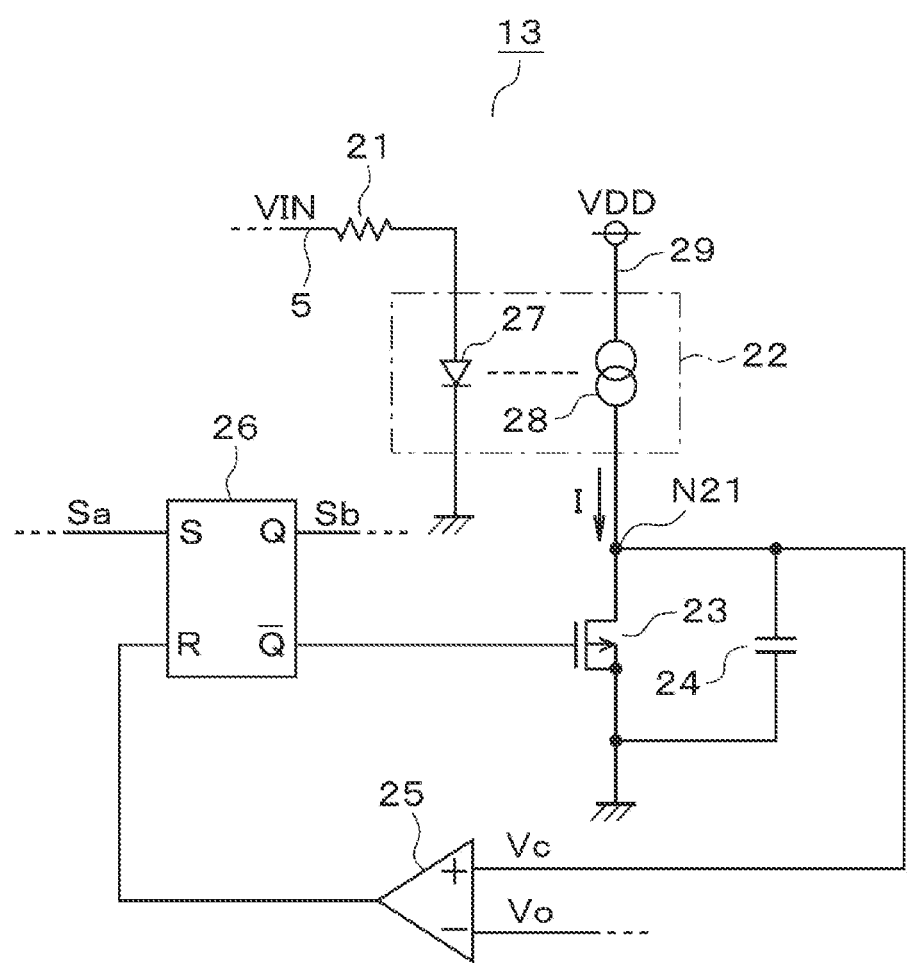
FIG. 11 is a diagram showing a second configuration example of a signal generation circuit according to the conventional configuration.
Figure 12:
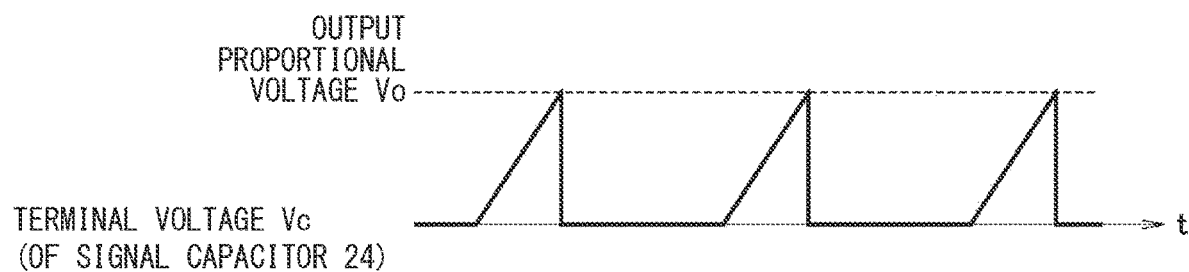
FIG. 12 is a timing chart schematically showing waveforms of a terminal voltage and an output proportional voltage of a capacitor according to the conventional configuration.
Figure 13:
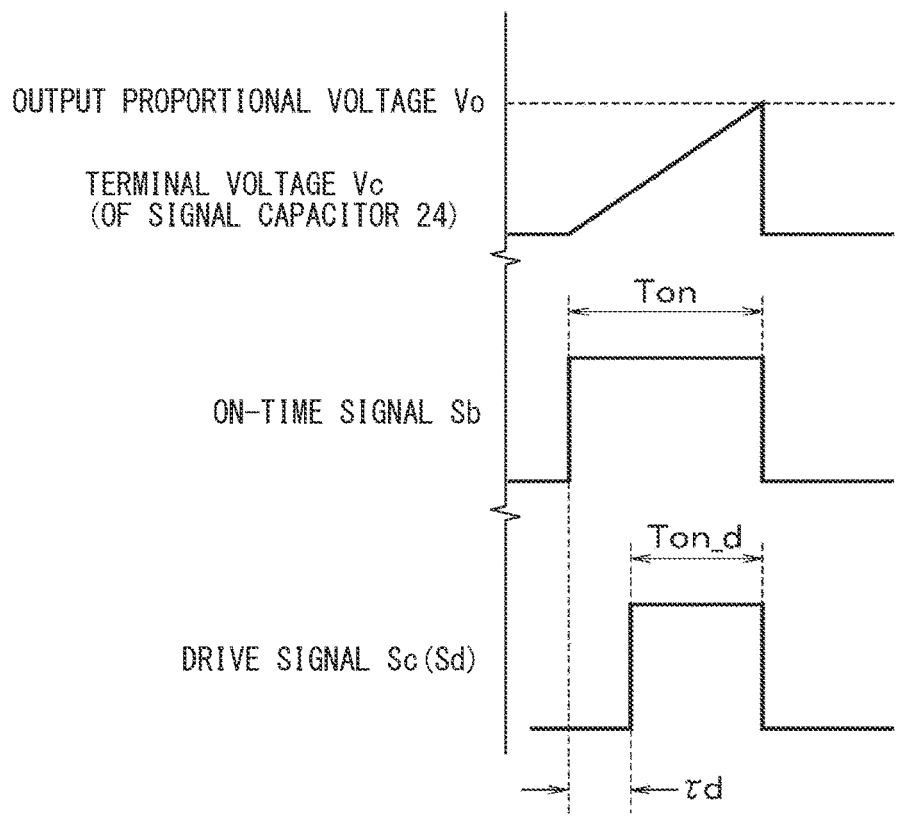
FIG. 13 is a timing chart schematically showing waveforms of a capacitor terminal voltage, an output proportional voltage, an ON-time signal, and a drive signal according to the conventional configuration.

As a specific configuration of the signal generation circuit 31, for example, a configuration example as shown in FIG. 2 can be mentioned. As shown in FIG. 2, the signal generation circuit 31 of the present embodiment is different from the signal generation circuit 13 of the conventional second configuration example shown in FIG. 11, as (i) including a current mirror circuit 32 instead of a current mirror circuit 22 of FIG. 11 with respect to the signal generation circuit 13 and (ii) additionally having a resistor 33, an amplifier 34 and an adder 35 added thereto. The current mirror circuit 32 is different from the current mirror circuit 22 in that a transistor 36 on an output side is added.

In such case, an amplification factor of an electric current I output from a transistor 28 is "gm," and an amplification factor of an electric current Ix output from the transistor 36 is "gmx." One of main terminals of the transistor 36 is connected to a power supply line 29, and the other one of main terminals is connected to a node N31. According to such a configuration, the current Ix becomes a current proportional to an input voltage VIN and is output toward the node N31. The resistor 33 is connected between the node N31 and the ground.

The resistor 33 has the same characteristics as a resistor 21, specifically, has the same temperature characteristics as the resistor 21, and is generated by the same process as the resistor 21. The voltage of the node N31 is obtained by converting the current Ix into a voltage by the resistor 33, and is a voltage proportional to the input voltage VIN. The voltage of the node N31 is input to the amplifier 34. The amplifier 34 outputs a voltage obtained by multiplying the input voltage by a gain K. The output voltage of the amplifier 34 becomes an offset voltage Vx proportional to the input voltage VIN, and is given to one of input terminals of the adder 35. An output proportional voltage Vo is applied to the other one of input terminals of the adder 35.

The adder 35 outputs a voltage Vo+Vx obtained by adding an offset voltage Vx to the output proportional voltage Vo. The output voltage of the adder 35 corresponds to a second reference voltage. In such case, the current mirror circuit 32, the resistor 33, the amplifier 34, and the adder 35 constitute a reference voltage generation unit 37 that generates the second reference voltage described above. The voltage Vo+Vx corresponding to the second reference voltage is given to the inverting input terminal of a comparator 25. In such case, the comparator 25 functions as a second comparator that compares a terminal voltage Vc and the voltage Vo+Vx of the capacitor 24.

According to the present embodiment described above, the following effects can be achieved. In the signal generation circuit 31 having the above configuration, the current Ix obtained by multiplying the input current of the current mirror circuit 32 proportional to the input voltage VIN by a gain gmx is generated, and the current Ix is converted into a voltage by the resistor 33. Then, in the signal generation circuit 31 having the above configuration, a voltage Vo+Vx obtained by adding an offset voltage Vx obtained by multiplying the converted voltage by a gain K with respect to the output proportional voltage Vo is given to the inverting input terminal of the comparator 25.

As described above, in the above configuration, in the comparator 25 for generating an ON-time signal Sb, the second reference voltage to be compared with the terminal voltage Vc of the capacitor 24 is a voltage Vo+Vx, which is the sum of (i) the output proportional voltage Vo and (ii) the offset voltage Vx that is proportional to the input voltage VIN. Therefore, a pulse width of the ON-time signal Sb generated by the signal generation circuit 31 changes according to the input voltage VIN, that is, the pulse width getting wider as the input voltage VIN becomes higher and getting narrower as the input voltage VIN becomes lower.

As a result, in the switching power supply circuit 1 of the present embodiment, the decrease in the pulse width due to an influence of a dead time id is corrected, and as a result, the fluctuation of the switching frequency is suppressed. Therefore, according to the present embodiment, it is possible to prevent the switching frequency from further increasing even when the input voltage VIN becomes relatively high due to the influence of the dead time id. By suppressing the fluctuation of the switching frequency in such manner as described above, the switching power supply circuit 1 of the present embodiment achieves an effect that the constant of the noise filter inserted on a substrate is optimized to suppress a radiation noise, thereby reducing the cost of such component.

Further, in the above configuration, by setting each circuit constant and the like as follows, it is possible to more reliably correct the decrease in the pulse width due to the influence of the dead time id. That is, in the present embodiment, the actual ON-time Ton_d, which is a pulse width of the drive signal Sc or Sd, is represented by the following equation (7).

[Equation (7)]

$$T_{on\_d} = \frac{V_o + V_x}{V_{IN}} \cdot \frac{1}{f_{SW}} - \tau_d \quad (7)$$

The following equation (8) is obtained as a condition that the actual ON-time Ton_d represented by the above equation (7) and the ON-time Ton in the switching power supply circuit 1 shown in the equation (4) are equal.

[Equation (8)]

$$V_x = V_{IN} \cdot \tau_d \cdot f_{sw} \quad (8)$$

By substituting the equation (5) for the above equation (8), the following equation (9) is obtained. However, in such case, the current amplification factor G is replaced with a current amplification factor gm.

Equation (9)

$$V_x = \frac{V_{IN}}{R} \cdot \frac{g_m}{C} \cdot \tau_d \quad (9)$$

On the other hand, the offset voltage Vx generated by the signal generation circuit 31 having the configuration shown in FIG. 2 is represented by the following equation (10). In the equation (10), Rx is a resistance value of the resistor 33.

Equation (10)

$$V_x = \frac{V_{IN}}{R} \cdot g_m \cdot R_x \cdot K \quad (10)$$

The following equation (11) is obtained from the equations (9) and (10).

Equation (11)

$$\tau_d = K \cdot \frac{g_{mx}}{g_m} \cdot R_x \cdot C \qquad (11)$$

Figure 3:
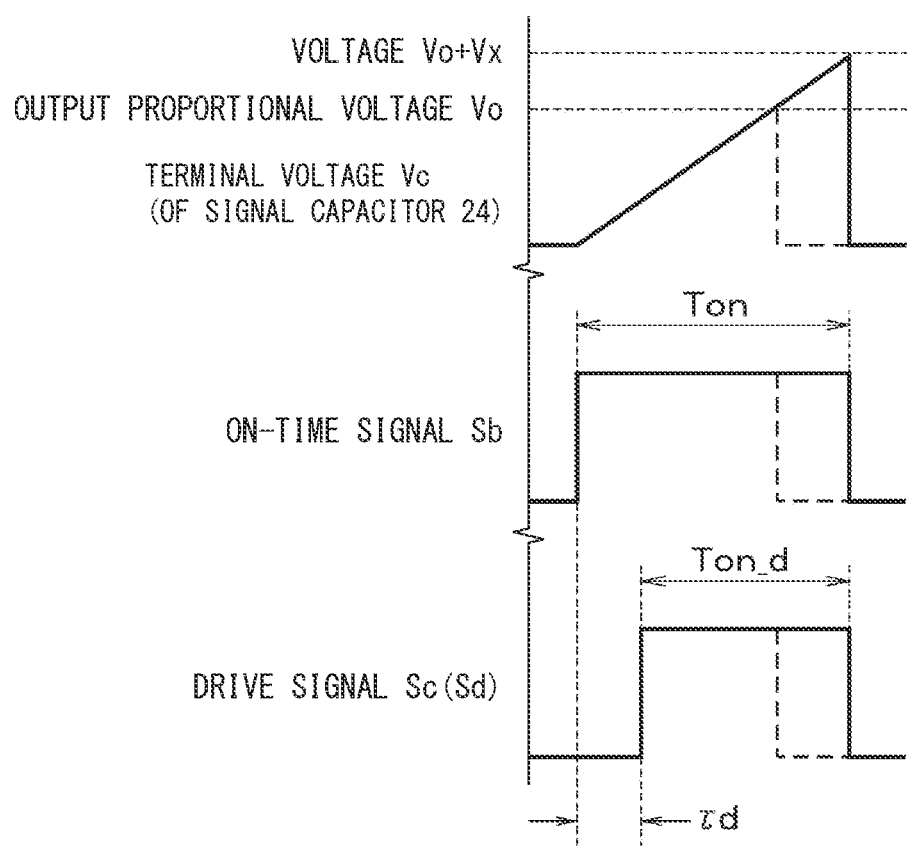
FIG. 3 is a timing chart schematically showing waveforms of a capacitor terminal voltage, an output proportional voltage, a second reference voltage, an ON-time signal, and a drive signal according to the first embodiment.

By setting each of the constants, that is, the gain K of the amplifier 34, the current amplification factors gm and gmx of the current mirror circuit 32, the resistance value Rx of the resistor 33, and a capacitance value C of the capacitor 24 to satisfy the above equation (11), the ON-time signal Sb having a pulse width Ton widened by an amount of the dead time td in advance is generated, as shown in FIG. 3. Therefore, even if the pulse width Ton_d of the drive signal Sc or Sd becomes narrow due to the influence of the dead time td, a target pulse width is maintainable. Therefore, according to the setting of the constants as described above, it is possible to more reliably suppress the fluctuation of the switching frequency regardless of the fluctuation of the input voltage VIN.

The signal generation circuit 31 having the above-described configuration converts, with the resistor 33 having the same characteristics as the resistor 21 for generating the input current, the current Ix obtained by multiplying the input current of the current mirror circuit 32 proportional to the input voltage VIN by the gain gmx to a voltage. In such manner, the resistance values R and Rx of the resistors 21 and 33 have the same mode in terms of (i) fluctuation due to temperature and (ii) process fluctuation, and as a result, the generation accuracy of the offset voltage Vx is improved and the fluctuation of the switching frequency is accurately suppressible.

Second Embodiment

Figure 4:
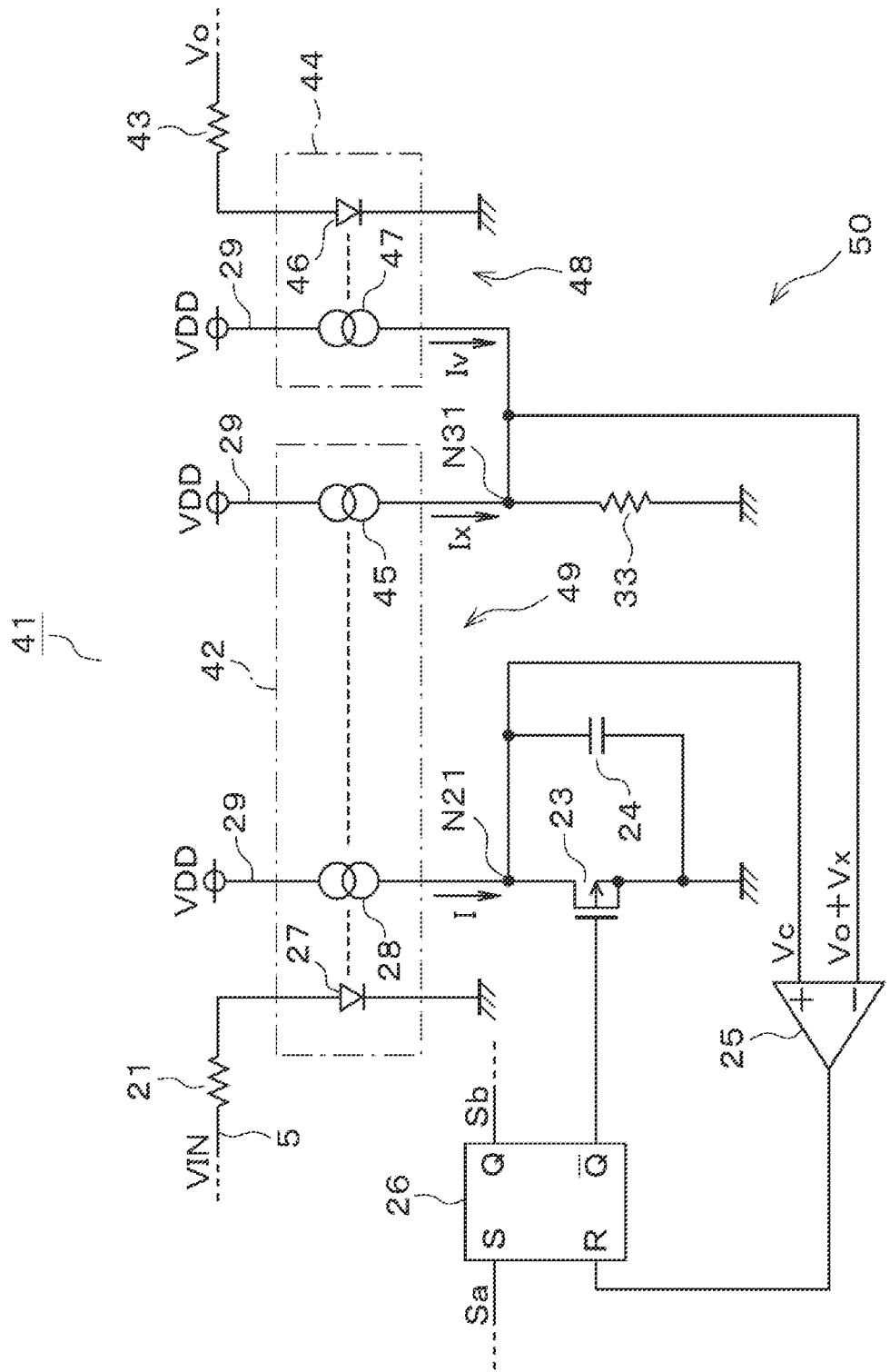
FIG. 4 is a diagram showing a specific configuration example of a signal generation circuit according to a second embodiment.

Hereinafter, the second embodiment in which the specific configuration of the signal generation circuit has been changed with respect to the first embodiment will be described with reference to FIG. 4. As shown in FIG. 4, a signal generation circuit 41 of the present embodiment includes a current mirror circuit 42 instead of the current mirror circuit 32 with respect to the signal generation circuit 31 of the first embodiment shown in FIG. 2, as well as a resistor 43 and a current mirror circuit 44 provided therein instead of the amplifier 34 and the adder 35, which are different from the first embodiment.

The current mirror circuit 42 is different from the current mirror circuit 32 in that a transistor 45 is provided instead of the transistor 36 on the output side. The current amplification factor of the current Ix output from the transistor 45 is "K×gmx." K is a value similar to the gain of the amplifier 34. One of main terminals of the transistor 45 is connected to the power supply line 29, and the other one of the main terminals is connected to the node N31. According to such a configuration, the current Ix output from the transistor 45 of the current mirror circuit 42 becomes a current proportional to the input voltage VIN and is output toward the node N31. In the following, the current Ix output from the transistor 45 is also referred to as an offset current.

The output proportional voltage Vo is applied to one terminal of the resistor 43, and the other terminal of the resistor 43 is connected to the ground via a transistor 46 on the input side of the current mirror circuit 44. Since the transistor 46 is connected as a diode, i.e., provided as a so-called diode connection, it is represented by a diode symbol in FIG. 4 and the like. One of main terminals of the transistor 47 on the output side of the current mirror circuit 44 is connected to the power supply line 29. Since the transistor 47 is a transistor for current output, it is represented by a symbol of a current source in FIG. 4 and the like. The current amplification factor of the current Iv output from the transistor 47 is "gmv." The other one of the main terminals of the transistor 47 is connected to the node N31.

According to such a configuration, the current Iv output from the current mirror circuit 44 becomes a current proportional to the output proportional voltage Vo, and thus becomes a current proportional to the output voltage VOUT, and is output toward the node N31. Note that, in the following, the current Iv output from the current mirror circuit 44 is also referred to as an output proportional current. The current amplification factor gmv is set to a value such that the voltage of the node N31 becomes the same voltage value as the output proportional voltage Vo when the current Ix output from the transistor 45 becomes zero. According to the above-described configuration, the voltage of the node N31 becomes the second reference voltage which is the voltage Vo+Vx obtained by adding the offset voltage Vx to the output proportional voltage Vo, and such a voltage is given to the inverting input terminal of the comparator 25.

In such case, the resistor 43 and the current mirror circuit 44 form a first current generation unit 48 that generates an output proportional current, and the resistor 21 and the current mirror circuit 42 form a second current generation unit 49 that generates an offset current. Further, in such case, the resistor 33 functions as a voltage generation unit that generates the offset voltage Vx by converting an added current, which is obtained by adding the offset current to the output proportional current, into a voltage. Further, in such case, the first current generation unit 48, the second current generation unit 49, and the resistor 33 constitute a reference voltage generation unit 50 that generates the second reference voltage.

The same effects as those of the first embodiment can be obtained by the present embodiment described above. Further, in the signal generation circuit 41 of the present embodiment, a current addition configuration is adopted as a configuration for adding the offset voltage Vx proportional to the input voltage VIN to the output proportional voltage Vo. According to the configuration of the present embodiment in which the electric current is added in the above-described manner, as compared with the configuration of the first embodiment in which the voltage is added, the amplifier 34 and the adder 35 are dispensable, which makes the configuration simpler than the first embodiment, and as a result, yielding the effects of reducing the circuit scale.

Third Embodiment

Figure 5:
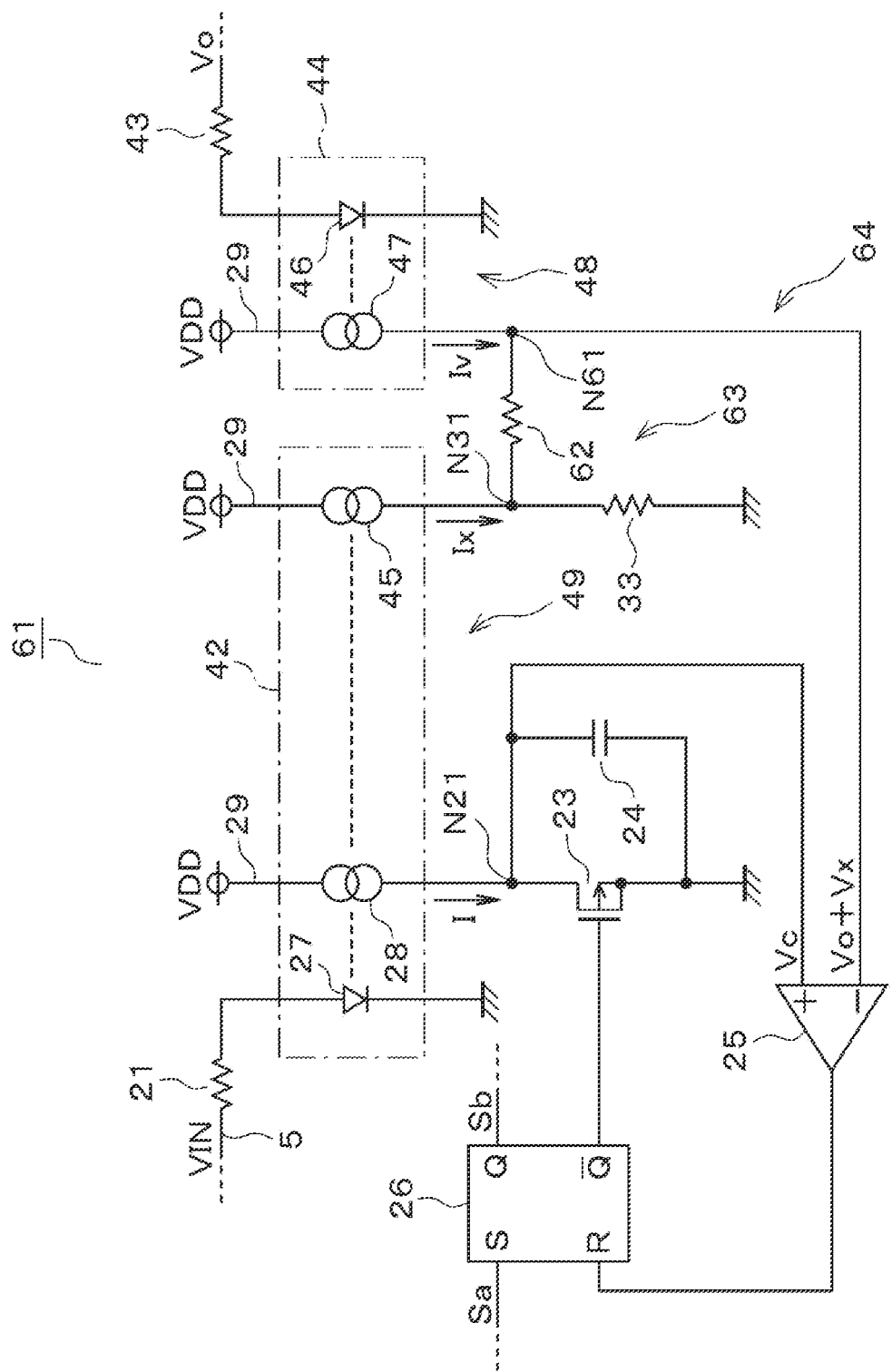
FIG. 5 is a diagram showing a specific configuration example of a signal generation circuit according to a third embodiment.

Hereinafter, a third embodiment is described with reference to FIG. 5, in which the specific configuration of the signal generation circuit of the second embodiment has been changed. As shown in FIG. 5, a signal generation circuit 61 of the present embodiment is different from the signal generation circuit 41 of the second embodiment shown in FIG. 4 in that a resistor 62 is added. In such case, the current amplification factor of the current Ix output from the transistor 45 of the current mirror circuit 42 is "gmx." The other one of main terminals of the transistor 47 of the current mirror circuit 44 is connected to a node N61. The resistor 62 is connected between the node N31 and the node N61. A resistance value R1 of the resistor 33 and a resistance value R2 of the resistor 62 are set to values that satisfy the following equations (12) and (13).

Equations (12) & (13)

$$R_x = R_1 + R_2 \tag{12}$$

$$K = \frac{R_1}{R_1 + R_2} \tag{13}$$

In the above configuration, a voltage generation unit 63 is configured/provided by a series circuit of two resistors 33 and 62 interposed in the path through which the current Iv, which is an output proportional current, flows. In such case, in addition to the current Iv, the current Ix, which is an offset current, also flows through the resistor 33 arranged on the low potential side of the two resistors 33, 62. The voltage generation unit 63 generates the offset voltage Vx from the terminal voltage of the series circuit of the resistors 33 and 62. In such case, the first current generation unit 48, the second current generation unit 49, and the voltage generation unit 63 constitute a reference voltage generation unit 64 that generates the second reference voltage.

The same effects as those of the second embodiment can be obtained by the present embodiment described above. Further, according to the signal generation circuit 61 of the present embodiment, the following effects can be achievable. That is, in the configuration of the second embodiment, the matching accuracy of the current mirror circuit 42 may become an issue, especially when the gain K is much smaller than 1, that is, when "K<<1." On the other hand, according to the configuration of the present embodiment, the gain K is set according to the resistance ratio of the resistors 33 and 62. Therefore, according to the present embodiment, it is possible to increase the current value of the current Ix output from the current mirror circuit 42, and the influence of the matching accuracy of the current mirror circuit 42 on the generation accuracy of the offset current is reducible, and, as a result, fluctuations in the switching frequency can be suppressed with high accuracy.

Fourth Embodiment

Figure 6:
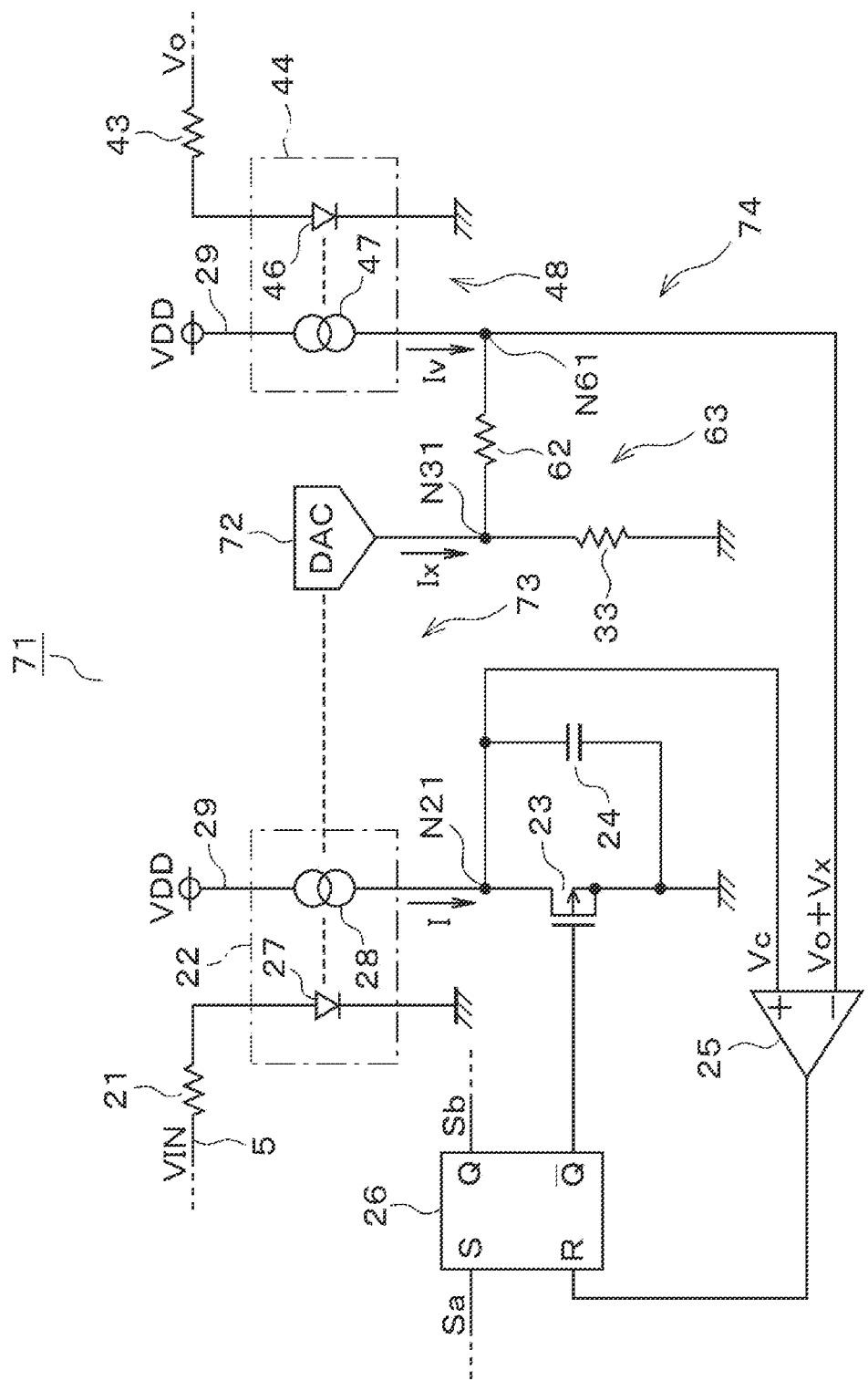
FIG. 6 is a diagram showing a specific configuration example of a signal generation circuit according to a fourth embodiment.

Hereinafter, the fourth embodiment is described with reference to FIG. 6, in which the specific configuration of the signal generation circuit has been changed with respect to the third embodiment. As shown in FIG. 6, a signal generation circuit 71 of the present embodiment has, instead of having the current mirror circuit 44, the current mirror circuit 22 and a D/A converter 72 with respect to the signal generation circuit 61 of the third embodiment shown in FIG. 5, which is difference of the fourth embodiment from the third embodiment. In the specification of the present application, the D/A converter may be abbreviated as DAC.

The DAC 72 has a current output type configuration, which is a configuration that outputs an electric current corresponding to an input digital value. The output current of the DAC 72 is configured to be a current obtained by multiplying the input current of the current mirror circuit 22 by the gain gmx. That is, the output current of the DAC 72 is a current proportional to the input voltage VIN. The current Ix output from the DAC 72 is output toward the node N31. In such case, the resistor 21, the current mirror circuit 22, and the DAC 72 constitute a second current generation unit 73 that generates an offset current. That is, the second current generation unit 73 generates an offset current from the output current of the DAC 72. Further, in such case, the first current generation unit 48, the second current generation unit 73, and the voltage generation unit 63 constitute a reference voltage generation unit 74 that generates the second reference voltage.

The same effects as those of the third embodiment can be obtained by the present embodiment described above. Further, according to the signal generation circuit 71 of the present embodiment, the following effects can be achievable. That is, since the signal generation circuit 71 generates an offset current from the output current of the DAC 72, the offset current can be finely adjusted according to the digital value input to the DAC 72. Therefore, according to the configuration of the present embodiment, the decrease in the pulse width due to the influence of the dead time id can be corrected with high accuracy, and, as a result, the fluctuation of the switching frequency can be reliably suppressible.

Further, the two switching elements 2 and 3 constituting the switching power supply circuit 1 are often provided as external components of the IC, and, in such case, the delays of the switching elements 2 and 3 may vary, which makes a variable dead time id configuration desirable. IC is an abbreviation for Integrated Circuit. In order to meet such a demand, the switching power supply circuit 1 has a configuration in which the dead time id can be set to an arbitrary time length. According to the signal generation circuit 71 of the present embodiment, it is possible to adjust the offset current setting according to an arbitrarily-set time length value being set as the dead time id. Therefore, according to the present embodiment, the decrease in the pulse width due to the influence of the dead time id can be corrected more accurately, and, as a result, the fluctuation of the switching frequency can be more reliably suppressible.

Fifth Embodiment

Figure 7:
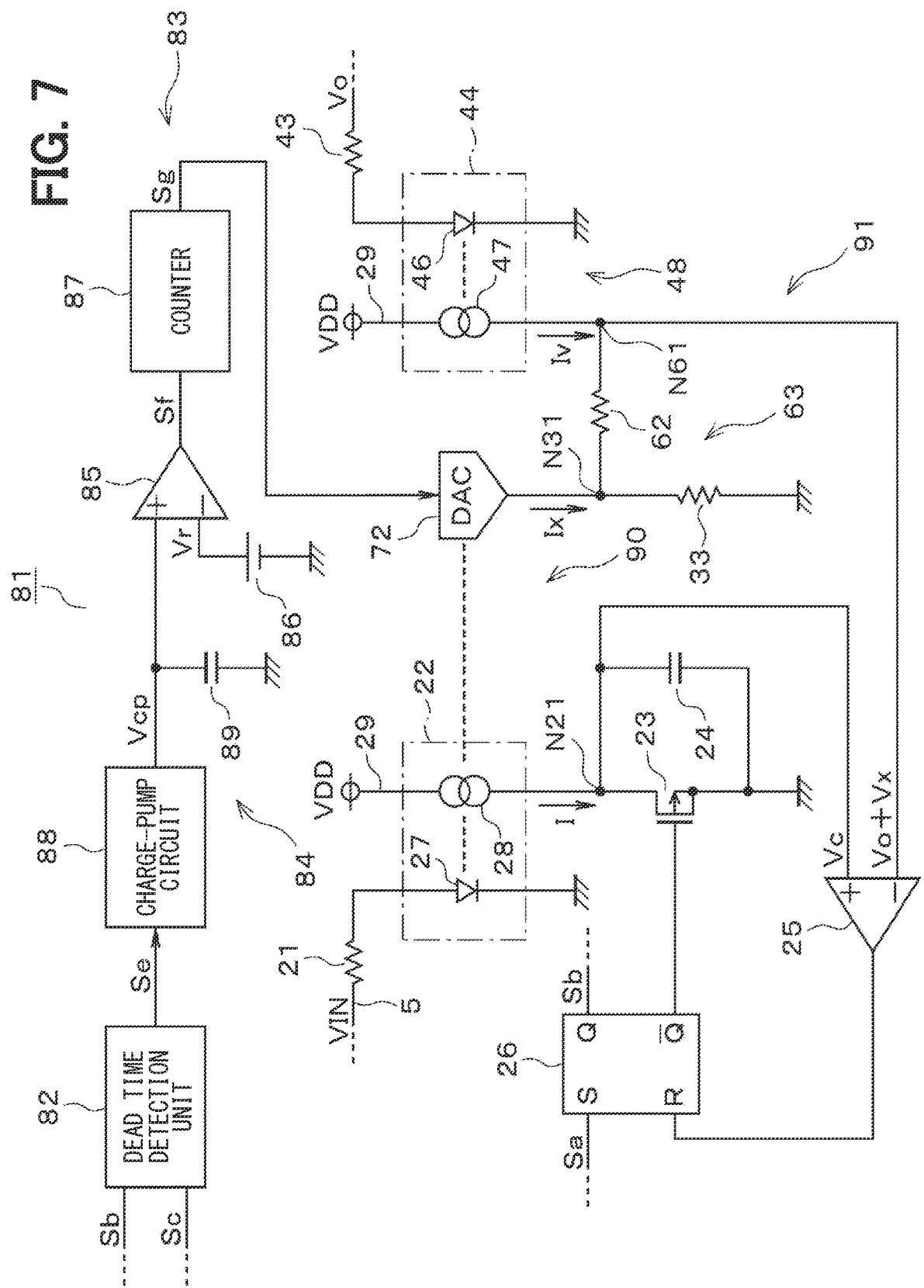
FIG. 7 is a diagram showing a specific configuration example of a signal generation circuit according to a fifth embodiment.
Figure 8:
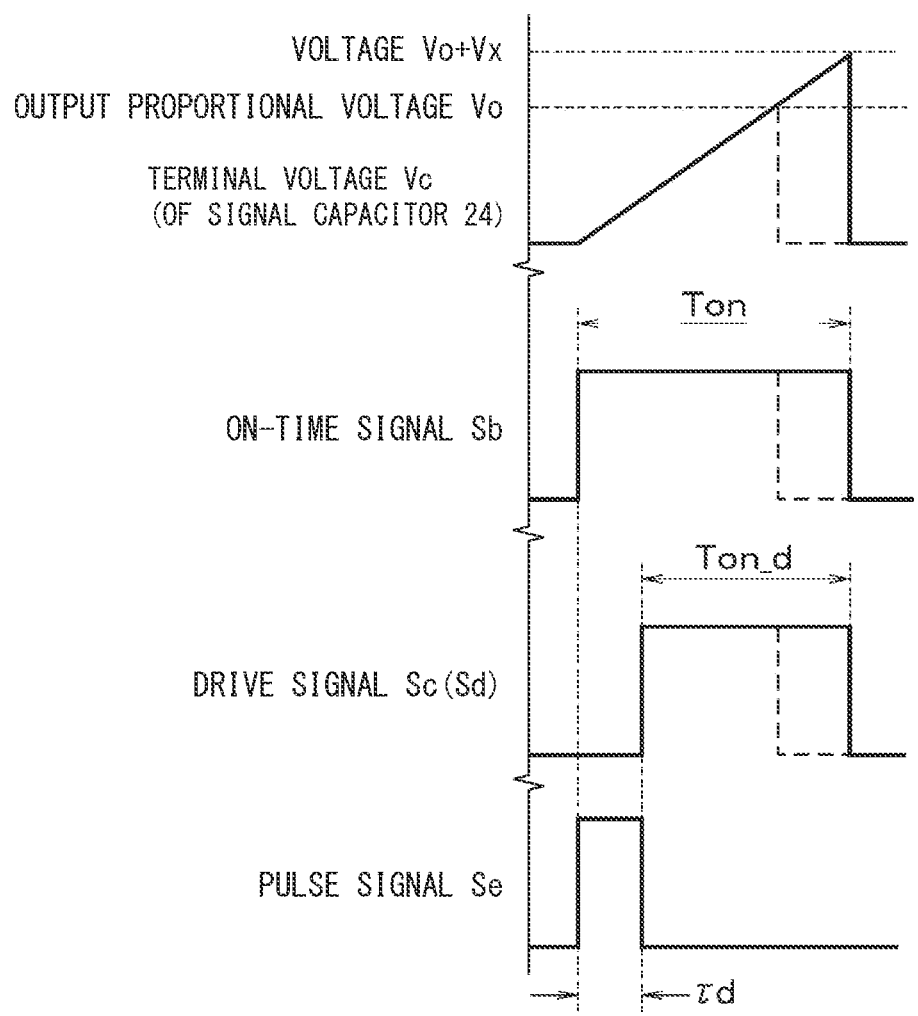
FIG. 8 is a timing chart schematically showing waveforms of a terminal voltage, an output proportional voltage, a second reference voltage, an ON-time signal, a drive signal, and a pulse signal of a capacitor according to the fifth embodiment.

Hereinafter, the fifth embodiment in which the specific configuration of the signal generation circuit has been changed with respect to the fourth embodiment will be described with reference to FIGS. 7 and 8. As shown in FIG. 7, a signal generation circuit 81 of the present embodiment has a dead time detection unit 82 and an output correction unit 83 added to the signal generation circuit 71 of the fourth embodiment shown in FIG. 6 are different among other things.

The ON-time signal Sb and the drive signal Sc are given to the dead time detection unit 82. The dead time detection unit 82 detects the dead time id, which is a period during which both the two switching elements 2 and 3 are OFF, based on the ON-time signal Sb and the drive signal Sc. Specifically, the dead time detection unit 82 generates a pulse signal Se as shown in FIG. 8 by logically synthesizing the ON-time signal Sb and the drive signal Sc. The pulse width of the pulse signal Se corresponds to a detected value of the dead time id. The dead time detection unit 82 may be configured to detect the dead time id based on the ON-time signal Sb and the drive signal Sd.

The pulse signal Se generated by the dead time detection unit 82 is given to the output correction unit 83. The output correction unit 83 corrects the output current of the DAC 72 based on the pulse signal Se, that is, the result of detection by the dead time detection unit 82. The output correction unit 83 includes an integration circuit 84, a comparator 85, a voltage source 86, and a counter 87. The integration circuit 84 includes a charge-pump circuit 88 and a capacitor 89. The charge-pump circuit 88 operates using the pulse signal Se as a clock. The capacitor 89 is connected between the output terminal of the charge-pump circuit 88 and the ground.

The integration circuit 84 having the above configuration integrates the pulse signal Se over a plurality of cycles, that is, a plurality of pulses, and outputs a voltage Vcp corresponding to the integration result. The voltage Vcp is a voltage corresponding to the electric charge that depends on the dead time id. The voltage Vcp is given to the non-inverting input terminal of the comparator 85, and a reference voltage Vr generated by the voltage source 86 is given to the inverting input terminal. The comparator 85 outputs, to the counter 87, a signal Sf corresponding to the comparison result of the voltage Vcp and the reference voltage Vr. The counter 87 is an up/down counter, performs a predetermined counting operation based on the signal Sf, and outputs s signal Sg corresponding to the count value to the DAC 72.

The DAC 72 is configured so that its output current is changed based on the signal Sg. In such case, the resistor 21, the current mirror circuit 22, the DAC 72, the dead time detection unit 82, and the output correction unit 83 constitute a second current generation unit 90 that generates an offset current. Further, in such case, the first current generation unit 48, the second current generation unit 90, and the voltage generation unit 63 constitute a reference voltage generation unit 91 that generates a second reference voltage. According to the above configuration, the offset current can be adjusted via the DAC 72. Such adjustment of the offset current may be performed only at the time of start-up, or it may be additionally performed constantly during the operation, or it may be performed at predetermined intervals during the operation.

The same effects as those of the fourth embodiment can be obtained by the present embodiment described above. Further, according to the signal generation circuit 81 of the present embodiment, the following effects can be obtained. That is, in the fourth embodiment, in the case of a configuration in which the dead time value is determined by a time constant of RC in the drive circuit 14, the dead time value can be corrected to include the temperature characteristics and process variations. However, in case that the dead time value is determined primarily by other factors such as transistor delay, the correction may possibly be not sufficient.

On the other hand, in the present embodiment, the dead time detection unit 82 directly detects the dead time id, and the output correction unit 83 adjusts the offset current, which is the output current of the DAC 73, according to the detection result of the dead time id. Therefore, according to the present embodiment, even when the dead time value in the drive circuit 14 is determined mainly by other factors such as transistor delay, corrections can still be made by the factors including temperature characteristics, process variations, and the like.

OTHER EMBODIMENTS

The present disclosure is not limited to the embodiments that have been described above and illustrated in the drawings, but can freely be modified, combined, or expanded without departing from the gist of the present disclosure. The numerical values and the like shown in the embodiments described above are examples, which do not limit those examples.

The present disclosure is not only applicable to the step-down switching power supply circuit 1, but is also applicable to a synchronous rectification type switching power supply circuit that converts an input voltage into a desired output voltage by the turning ON and OFF of two switching elements in a complementary manner, such as a step-up switching power supply circuit. In each of the above embodiments, the output voltage VOUT itself may be used at the place where the output proportional voltage Vo proportional to the output voltage VOUT is used.

Although the present disclosure has been described in accordance with the embodiments, it is to be understood that the disclosure is not limited to such examples or structures. The present disclosure also encompasses various modifications and variations within an equivalent range. In addition, various combinations and forms, and further, other combinations and forms including only one element, or more or less than these elements are also within the sprit and the scope of the present disclosure.

What is claimed is:

1. A switching power supply circuit including two switching elements, and provided as a synchronous rectification type switching power supply circuit, and converting an input voltage into a desired output voltage by turning the two switching elements ON and OFF in a complementary manner, the switching power supply circuit comprising:
a first comparator that compares a feedback voltage corresponding to the output voltage and a predetermined first reference voltage;
a signal generation circuit that generates an ON-time signal corresponding to an ON-time for turning ON the two switching elements based on an output signal of the first comparator, the input voltage, and the output voltage; and
a drive circuit that drives the two switching elements based on the ON-time signal, wherein
the signal generation circuit includes:
a capacitor that is charged and discharged by an electric current proportional to the input voltage;
a switch that controls charging and discharging of the capacitor based on the output signal of the first comparator;
a reference voltage generator that generates a second reference voltage, which is a voltage obtained by adding an offset voltage proportional to the input voltage to an output proportional voltage proportional to the output voltage;
a second comparator that compares a terminal voltage of the capacitor and the second reference voltage, and
the switching power supply circuit generates the ON-time signal based on an output signal of the second comparator.

2. The switching power supply circuit of claim 1, wherein the reference voltage generator includes:
a first current generation unit that generates an output proportional current proportional to the output voltage;
a second current generation unit that generates an offset current proportional to the input voltage; and
a voltage generation unit that generates the offset voltage by converting an added current that is obtained by adding the offset current to the output proportional current into a voltage.

3. The switching power supply circuit of claim 2, wherein the voltage generation unit includes
a series circuit of two resistors interposed in a path through which the output proportional current flows,
a low potential side resistor among the two resistors has the offset current flowing therethrough, and the offset voltage is generated from the terminal voltage of the series circuit.

4. The switching power supply circuit of claim 2, wherein the second current generation unit includes a current output type D/A converter, and
the offset current is generated from an output current of the D/A converter.

5. The switching power supply circuit of claim 4, wherein the second current generation unit includes:
a dead time detection unit that detects a dead time, which is a period during which both of the two switching elements are OFF; and
an output correction unit that corrects the output current of the D/A converter based on a detection result by the dead time detection unit.

6. A switching power supply circuit comprising:
an input switch configured to:
  (i) receive an input voltage,
  (ii) output the input voltage to a first node, and
  (iii) receive a first drive signal;
a ground switch configured to:
  (i) receive the input voltage from the first node,
  (ii) output to the ground, and
  (iii) receive a second drive signal;
an inductor configured to:
  (i) receive the input voltage from the first node,
  (ii) output an output voltage to a power capacitor, and
  (iii) output the output voltage to an upper resister;
the power capacitor connected to the inductor, to a ground, and to the upper resistor;
a lower resistor in a voltage-dividing series with the upper resistor, such that a second node is located between the upper resistor and the lower resistor;
a first comparator configured to:
  (i) receive a feedback voltage from the second node into a first inverting input,
  (ii) receive a reference voltage into a first non-inverting input, and
  (iii) output a trigger signal;
a signal generation circuit configured to:
  (i) receive the trigger signal,
  (ii) receive a power supply voltage,
  (iii) receive the input voltage,
  (iv) receive an output proportional voltage, and
  (v) output an ON-time signal; and
a drive circuit configured to:
  (i) receive the ON-time signal,
  (ii) output the first drive signal to control the input switch, and
  (iii) output the second drive signal to control the ground switch),
wherein the signal generation circuit comprises:
  an input resistor configured to receive an input voltage;
  a first current mirror including:
    (i) a first diode connected to the input resistor and connected to the ground,
    (ii) a first mirror transistor configured to: receive a power supply voltage, apply a first mirror gain, and output a first proportional current to a first signal node, and
    (iii) a second mirror transistor configured to: receive the power supply voltage, apply a second mirror gain, and output a second proportional current to a second signal node;
  a signal transistor configured to:
    (i) receive at least a portion of the first proportional current from the first signal node,
    (ii) receive an inverted ON-time signal, and
    (iii) output to the ground;
  a signal capacitor connected to the first signal node and connected to the ground;
  a signal resistor connected to the second signal node and connected to the ground;
  a reset comparator configured to:
    (i) receive a terminal voltage at a reset comparator non-inverting input,
    (ii) receive a second reference voltage at a reset comparator inverting input, and
    (iii) output a reset signal; and
  an SR latch including:
    (i) a set input configured to receive the trigger signal,
    (ii) a reset input configured to receive the reset signal,
    (iii) a latch non-inverting output configured to output the ON-time signal, and
    (iv) a latch inverting output configured to output the inverted ON-time signal to the signal transistor.

7. The switching power supply circuit of claim 6, wherein the signal generation circuit further comprises: a signal amplifier configured to: (i) input from the second signal node, (ii) amplify using a signal amplifier gain, and (iii) output an offset voltage; and an adder configured to: (i) receive the offset voltage, (ii) receive an output proportional voltage, and (iii) output the second reference voltage to the inverting input of the reset comparator.

* * * * *